United States Patent
Nomura et al.

(10) Patent No.: US 8,673,492 B2
(45) Date of Patent: *Mar. 18, 2014

(54) CATHODE PLATE FOR NON-AQUEOUS ELECTROLYTE SECONDARY BATTERY, METHOD FOR PRODUCING THE SAME, AND NON-AQUEOUS ELECTROLYTE SECONDARY BATTERY

(75) Inventors: Keisuke Nomura, Matsudo (JP); Fumiaki Kikuchi, Matsudo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 28 days.

This patent is subject to a terminal disclaimer.

(21) Appl. No.: 13/139,688

(22) PCT Filed: Apr. 13, 2010

(86) PCT No.: PCT/JP2010/056584
§ 371 (c)(1),
(2), (4) Date: Jun. 14, 2011

(87) PCT Pub. No.: WO2010/122922
PCT Pub. Date: Oct. 28, 2010

(65) Prior Publication Data
US 2011/0250494 A1    Oct. 13, 2011

(30) Foreign Application Priority Data

Apr. 24, 2009  (JP) ................................. 2009-107185
Sep. 30, 2009  (JP) ................................. 2009-226482

(51) Int. Cl.
*H01M 4/02*    (2006.01)

(52) U.S. Cl.
USPC ... 429/209; 429/188; 429/231.5; 429/231.95; 429/122; 429/211; 427/77

(58) Field of Classification Search
USPC ......... 429/188, 231.5, 231.95, 209, 122, 211; 427/77
See application file for complete search history.

(56) References Cited

U.S. PATENT DOCUMENTS

| 4,902,589 A | 2/1990 | Dahn et al. |
| 5,856,045 A | 1/1999 | Fauteux et al. |

(Continued)

FOREIGN PATENT DOCUMENTS

| CN | 1627550 A | 6/2005 |
| CN | 1930706 A | 3/2007 |

(Continued)

OTHER PUBLICATIONS

Nov. 22, 2011 International Preliminary Report on Patentability issued in International application No. PCT/JP2010/056584 (with English translation).

(Continued)

*Primary Examiner* — Patrick Ryan
*Assistant Examiner* — Alex Usyatinsky
(74) *Attorney, Agent, or Firm* — Oliff PLC

(57) ABSTRACT

A negative electrode plate for a nonaqueous electrolyte secondary battery, which includes a collector, and an electrode active material layer that is arranged on the collector. The electrode active material layer contains a negative electrode active material, and a metal oxide or an elemental metal. The negative electrode active material is firmly affixed onto the collector by the metal oxide or elemental metal.

10 Claims, 1 Drawing Sheet

(56) References Cited

U.S. PATENT DOCUMENTS

| | | | |
|---|---|---|---|
| 2002/0009645 A1 | 1/2002 | Shima et al. | |
| 2002/0039684 A1 | 4/2002 | Matsubara et al. | |
| 2002/0055046 A1 | 5/2002 | Ono et al. | |
| 2003/0082453 A1 | 5/2003 | Numata et al. | |
| 2004/0131940 A1 | 7/2004 | Suzuki et al. | |
| 2005/0098242 A1 | 5/2005 | Hossick-Schott et al. | |
| 2005/0130042 A1* | 6/2005 | Liu et al. | 429/231.3 |
| 2006/0003226 A1 | 1/2006 | Sawa et al. | |
| 2006/0154071 A1 | 7/2006 | Homma et al. | |
| 2006/0216604 A1 | 9/2006 | Kawase et al. | |
| 2007/0003829 A1 | 1/2007 | Imachi et al. | |
| 2007/0154807 A1 | 7/2007 | Kalynushkin et al. | |
| 2008/0032197 A1 | 2/2008 | Horpel et al. | |
| 2008/0131781 A1 | 6/2008 | Yong et al. | |
| 2010/0000079 A1 | 1/2010 | Hörpel et al. | |
| 2010/0003401 A1 | 1/2010 | Hörpel et al. | |
| 2010/0203393 A1 | 8/2010 | Depond | |

FOREIGN PATENT DOCUMENTS

| | | |
|---|---|---|
| FR | 2 890 785 A1 | 3/2007 |
| JP | A-06-349482 | 12/1994 |
| JP | WO 95/09449 A1 | 4/1995 |
| JP | A-9-503092 | 3/1997 |
| JP | A-10-208747 | 8/1998 |
| JP | A-11-144736 | 5/1999 |
| JP | A-2000-277119 | 10/2000 |
| JP | A-2010-129418 | 10/2000 |
| JP | A-2001-155739 | 6/2001 |
| JP | A-2001-508916 | 7/2001 |
| JP | A-2002-141069 | 5/2002 |
| JP | A-2002-260656 | 9/2002 |
| JP | A-2003-142101 | 5/2003 |
| JP | A-2003-317707 | 11/2003 |
| JP | A-2004-087492 | 3/2004 |
| JP | A-2004-103304 | 4/2004 |
| JP | A-2005-78985 | 3/2005 |
| JP | A-2005-78991 | 3/2005 |
| JP | A-2006-107750 | 4/2006 |
| JP | A-2006-310010 | 11/2006 |
| JP | A-2007-527603 | 9/2007 |
| JP | A-2008-517435 | 5/2008 |
| JP | A-2009-104818 | 5/2009 |
| JP | A-20096-181879 | 8/2009 |
| JP | A-2010-67436 | 6/2010 |
| WO | WO 98/22986 A2 | 5/1998 |
| WO | WO 2006/019245 | 2/2006 |
| WO | WO 2006/045339 A2 | 5/2006 |

OTHER PUBLICATIONS

International Search Report in International Application No. PCT/JP2010/056584; dated Jul. 6, 2010 (with English-language translation).

Jul. 27, 2010 International Search Report issued in International Application No. PCT/JP2010/056913 (with translation).

Dec. 1, 2011 International Preliminary Report on Patentability issued in International Application No. PCT/JP2010/056913.

May 31, 2012 Office Action issued in U.S. Appl. No. 12/659,738.

Dec. 1, 2010 Notification of Reasons for Rejection issued in corresponding Japanese Patent Application No. 2008-252684 (with translation).

U.S. Appl. No. 12/659,738 filed in the name of Hiroyuki Kobori et al. on Mar. 19, 2010.

Dec. 1, 2010 Office Action issued in Japanese Patent Application No. 2008-252685 (with translation).

Mar. 22, 2012 Office Action issued in U.S. Appl. No. 12/659,892.

Nov. 10, 2011 Office Action issued in U.S. Appl. No. 12/659,892.

U.S. Appl. No. 12/659,892 filed in the name of Hiroyuki Kobori on Mar. 24, 2010.

Jul. 20, 2010 International Search Report issued in International Patent Application No. PCT/JP2010/056939.

Jul. 20, 2010 International Preliminary Report on Patentability issued in International Patent Application No. PCT/JP2010/056939.

Jul. 27, 2011 Office Action issued in Japanese Patent Application No. 2010-024837 (with translation).

Jul. 20, 2010 International Search Report issued in International Application No. PCT/JP2010/056940 (with translation).

Nov. 22, 2011 International Preliminary Report on Patentability issued in International Application No. PCT/JP2010/056912.

Jul. 27, 2010 International Search Report issued in International Patent Application No. PCT/JP2010/056912 (with translation).

U.S. Appl. No. 13/234,581, filed Sep. 16, 2011 in the name of Hiroyuki Kobori et al.

Jun. 8, 2012 U.S. Office Action issued in U.S. Appl. No. 13/234,581.

U.S. Appl. No. 13/265,220, filed Oct. 19, 2011 in the name of Hiroyuki Kobori et al.

Jun. 27, 2012 U.S. Office Action issued in U.S. Appl. No. 13/265,220.

U.S. Appl. No. 13/265,266, filed Oct. 19, 2011 in the name of Hiroyuki Kobori et al.

Jun. 21, 2012 U.S. Office Action issued in U.S. Appl. No. 13/265,266.

U.S. Appl. No. 13/257,177, filed Sep. 16, 2011 in the name of Hiroyuki Kobori et al.

Jun. 21, 2012 U.S. Office Action issued in U.S. Appl. No. 13/257,177.

U.S. Office Action dated Nov. 26, 2012 issued in U.S. Appl. No. 12/659,738.

Sep. 10, 2013 Office Action issued in U.S. Appl. No. 12/659,738.

Office Action dated Sep. 11, 2013 issued in Chinese Patent Application No. 201080018355.3 (with English translation).

* cited by examiner

CATHODE PLATE FOR NON-AQUEOUS ELECTROLYTE SECONDARY BATTERY, METHOD FOR PRODUCING THE SAME, AND NON-AQUEOUS ELECTROLYTE SECONDARY BATTERY

BACKGROUND OF THE INVENTION

1. Field of the Invention

The present invention relates to a cathode plate for use in a non-aqueous electrolyte secondary battery such as lithium-ion secondary battery, to a non-aqueous electrolyte secondary battery using the same, and to a method for producing the cathode plate for a non-aqueous electrolyte secondary battery.

2. Background Art

Non-aqueous electrolyte secondary batteries represented by lithium-ion secondary batteries have high energy density and high voltage, and do not cause the memory effect (a phenomenon in which a battery gradually loses its capacity when the battery is charged before the battery is completely discharged) on charge or discharge. The non-aqueous electrolyte secondary batteries are therefore used in various fields of portable devices, large-sized devices, and so forth. Further, in recent years, the use of secondary batteries in the fields of electric vehicles, hybrid vehicles, power tools, etc. that are needed to have high output characteristics has attracted public attention.

A non-aqueous electrolyte secondary battery is generally composed of an anode plate, a cathode plate, a separator, and an organic electrolyte. For the anode plate and the cathode plate is usually used an electrode active material layer formed in the following manner: an electrode active material layer-forming coating liquid in the form of a slurry is applied to the surface of a current collector made of metal foil or the like, and is then dried with hot air or the like, and the dried film is pressed with a roller press or the like.

The electrode active material layer-forming coating liquid is a slurry prepared by kneading and/or dispersing in an organic solvent an electrode active material, a resinous binder, and a conductive material (provided that when the active material also has electrical conductivity, the conductive material may not be used), and other materials as needed. It is a conventional manner in which an electrode having an electrode active material layer is produced is that the above electrode active material layer-forming coating liquid is applied to the surface of a current collector and then dried, and the coating film formed on the current collector in this manner is pressed (e.g., paragraphs [0019] to [0026] of the specification of Patent Document 1; and paragraphs [0051] to [0055] of the specification of Patent Document 2 and [Claim 1] attached to the specification).

The electrode active material to be incorporated in the electrode active material layer-forming coating liquid is a particulate compound dispersible in the coating liquid and hardly fixes to the surface of a current collector when the coating liquid is simply applied to the current collector surface. Besides, a coating film formed by applying an electrode active material layer-forming coating liquid containing no resinous binder to a current collector and drying the applied coating liquid easily peels off the current collector. That is to say, electrode active material particles are bound together and are also fixed to the surface of a current collector through a resinous binder, whereby an electrode active material layer is formed. Thus, a resinous binder has been considered to be a substantially essential ingredient in the prior art.

On the other hand, the above conductive material is used to ensure good electronic conduction between the electrode active material in the electrode active material layer and the current collector, thereby decreasing the volume resistivity of the electrode active material layer itself.

PATENT DOCUMENTS

Patent Document 1: JP 2006-310010A
Patent Document 2: JP 2006-107750A

SUMMARY OF THE INVENTION

As mentioned above, the use of secondary batteries having high output and input characteristics is expected in recent years in a wide variety of fields, such as the fields of electric vehicles, hybrid vehicles and power tools, and the fields of relatively small-sized devices that tend to be provided with a greater number of functions, such as mobile phones. In order for secondary batteries to attain high output and input characteristics, they are needed to have decreased impedance. This is because high-impedance batteries have some problems; for example, they cannot make the best use of their capacity on high-output discharge and high-rate charge.

The inventors made extensive studies especially on cathode plate, which is considered to be a factor that makes the impedance of a conventional non-aqueous electrolyte secondary battery high, and found that a resinous binder present in an electrode active material layer in a conventional cathode plate is one of the causes of high impedance. Namely, the inventors found that there exist the following problems: the presence of a resinous binder in an electrode active material layer makes the distance of movement of cathode active material ions such as lithium ions and electrons longer, and also makes the electrode active material layer less permeable to an electrolyte, resulting in decrease in contact area between the electrolyte and the active material.

The present invention was accomplished in the light of the aforementioned problems in the prior art. An object of the present invention is therefore to provide a cathode plate for a non-aqueous electrolyte secondary battery, comprising an electrode active material layer whose formation does not rely on the presence of a resinous binder, being capable of performing high output and input. Another object of the present invention is to provide a method for producing a cathode plate in which a cathode active material is satisfactorily fixed to the surface of a current collector, though no resinous binder is present, and shows adhesion to the current collector comparable to that in conventional cathodes, thereby making it possible to provide a non-aqueous electrolyte secondary battery capable of performing high output and input.

The inventors found that fixing a cathode active material to a current collector without using a resinous binder is made possible by the following method: an electrode active material layer-forming composition containing at least a precursor to a metal oxide and a cathode active material is applied to a current collector, and is then heated. The inventors also found that the cathode plate for a non-aqueous electrolyte secondary battery, in which the cathode active material is, without a resinous binder, fixed to the current collector owing to the presence of the metal oxide, or of a simple metal produced in the electrode active material layer by reduction of the metal oxide, can provide decreased impedance and increased discharge rate characteristics. The present invention was accomplished on the basis of these findings.

(1) The present invention is a cathode plate for a non-aqueous electrolyte secondary battery, comprising a current collector, and an electrode active material layer containing at least a cathode active material and a metal oxide or a simple metal, layered over the current collector, wherein the cathode plate active material is fixed to the current collector owing to the metal oxide or the simple metal.

(2) The present invention is the cathode plate for a non-aqueous electrolyte secondary battery, wherein the metal oxide or the simple metal does not occlude or release any alkaline metal.

(3) The present invention is the cathode plate for a non-aqueous electrolyte secondary battery, wherein the metal oxide is copper oxide, yttrium oxide, iron oxide, barium oxide or zinc oxide, and the simple metal is copper, yttrium, iron, barium or zinc.

(4) The present invention is the cathode plate for a non-aqueous electrolyte secondary battery, wherein the metal oxide is a ternary metal double oxide (ternary metal complex oxide) containing three different metal elements, or the simple metal is a ternary composite metal consisting of three different metal elements.

(5) The present invention is the cathode plate for a non-aqueous electrolyte secondary battery, wherein the ternary metal double oxide is $La_xLi_yTiO_3$ or the ternary composite metal is $La_xLi_yTi$.

(6) The present invention is the cathode plate for a non-aqueous electrolyte secondary battery, wherein in the ternary metal double oxide ($La_xLi_yTiO_3$) or in the ternary composite metal ($La_xLi_yTi$), lanthanum and lithium are in a ratio that fulfills the conditions $0<X<1$ and $0<Y<1$.

(7) The present invention is the cathode plate for a non-aqueous electrolyte secondary battery, wherein the cathode active material is a carbonaceous material or lithium titanate.

(8) The present invention is the cathode plate for a non-aqueous electrolyte secondary battery, wherein the simple metal is one produced in the electrode active material layer by reduction of the metal oxide.

(9) The present invention is a non-aqueous electrolyte secondary battery, comprising an anode plate, a cathode plate, a separator placed between the anode plate and the cathode plate, an electrolyte containing a non-aqueous solvent, and a container in which the anode plate, the cathode plate, the separator and the electrolyte are contained, wherein the cathode plate comprises a current collector, and an electrode active material layer containing at least a cathode active material and a metal oxide or a simple metal, layered over the current collector, where the cathode active material is fixed to the current collector owing to the metal oxide or the simple metal.

(10) The present invention is a method for producing a cathode plate for a non-aqueous electrolyte secondary battery, comprising the steps of preparing a current collector, preparing an electrode active material layer-forming composition by mixing at least a cathode active material with a metal ion solution containing metal ions, applying the electrode active material layer-forming composition to the current collector, thereby forming a coating film, and heating the coating film so as to oxidize the metal ion to form a metal oxide and to fix the cathode active material to the current collector by making use of the metal oxide, thereby forming an electrode active material layer.

The cathode plate for a non-aqueous electrolyte secondary battery of the present invention is significantly improved in discharge rate characteristics as compared with a conventional cathode plate for a non-aqueous electrolyte secondary battery in which a cathode active material is fixed to a current collector by means of a resinous binder.

The following is considered to be the reason for the above improvement in discharge rate characteristics: owing to the metal oxide or simple metal, the particulate cathode active material fixes to the current collector in the absence of a resinous binder and forms the electrode active material layer.

By the method for producing a cathode plate for a non-aqueous electrolyte secondary battery of the present invention, there can be easily produced a cathode plate for a non-aqueous electrolyte secondary battery that comprises an electrode active material layer containing no resinous binder. In a conventional method in which a slurried coating liquid containing a particulate cathode active material dispersed in it is applied to the surface of a current collector, is dried, and is then pressed onto the current collector, it has been substantially impossible to fix the cathode active material to the current collector without the use of a resinous binder. On the other hand, in the production method of the invention, an electrode active material layer-forming composition prepared by mixing a cathode active material with a metal ion solution containing metal ions is applied to a current collector and then heated. By simply performing this operation, there can be obtained a cathode plate for a non-aqueous electrolyte secondary battery having desirable discharge rate characteristics.

A non-aqueous electrolyte secondary battery using the above cathode plate of the present invention can show extremely high discharge rate characteristics as compared with conventional ones. The cathode plate of the present invention thus makes it possible to provide a high-performance non-aqueous electrolyte secondary battery that can be used in the fields of electric vehicles, hybrid vehicles, power tools, etc. that are needed to have high output and input characteristics and also in relatively small-sized devices that are made multifunctional, such as mobile phones.

DETAILED DESCRIPTION OF THE INVENTION

[Cathode for Non-aqueous Electrolyte Secondary Battery]

Figure 2:
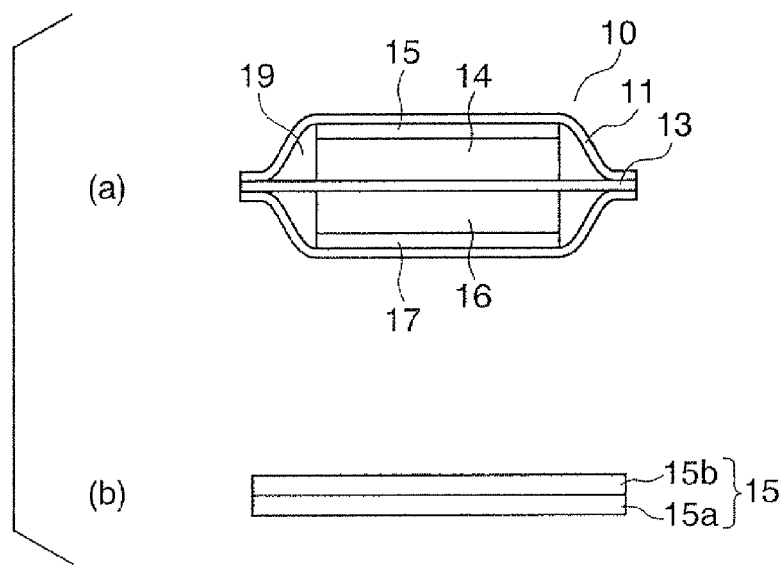
FIG. 2(a) is a view showing a non-aqueous electrolyte secondary battery.
FIG. 2(b) is a view showing a cathode plate for a non-aqueous electrolyte secondary battery.

A cathode plate 15 for a non-aqueous electrolyte secondary battery of the present invention comprises a current collector 15a and an electrode active material layer 15b containing a cathode active material and a metal oxide, layered over on at least part of the surface of the current collector 15a, as shown in FIG. 2(b). Embodiments for carrying out the cathode plate 15 for a non-aqueous electrolyte secondary battery of the present invention will be described hereinafter.

(Current Collector)

Any current collector that is usually used as a cathode current collector in a cathode for a non-aqueous electrolyte secondary battery can be used herein. For example, a current collector made from a simple metal such as copper, aluminum or nickel, or its metal alloy is used, and copper foil, such as electrolytic or rolled copper foil, is favorably used. The cathode current collector may have any thickness as long as it can be used as a current collector for an ordinary cathode for a non-aqueous electrolyte secondary battery. It is, however, preferred that the thickness of the current collector be in a range of 5 to 100 μm, more preferably in a range of 10 to 50

μm. The current collector may be subjected to corona discharge treatment, oxygen plasma discharge treatment, or the like as needed before use so that a solution applied to the current collector surface can show improved film-forming properties.

(Electrode Active Material Layer)

The electrode active material layer in the present invention has the following features: it contains at least a cathode active material and a metal oxide or a simple metal, but not contains a resinous binder that has been usually used in the prior art; and the cathode active material fixes to the current collector owing to the metal oxide or the simple metal. Fluorinated polymers such as polytetrafluoroethylene and polyvinylidene fluoride, polyolefin polymers such as polyethylene and polypropylene, synthetic rubber, etc. are mentioned as examples of resinous binders that have been used in conventional electrode active material layers. In the cathode of the present invention, however, the cathode active material can be fixed to the current collector in the absence of such a resinous binder.

Cathode Active Material:

Any known cathode active material can be used without limitation as the cathode active material for use in the present invention. Favorable examples of the cathode active material are specifically natural graphite, synthetic graphite, amorphous carbon, carbon black, and carbonaceous materials obtained by adding other elements to the above materials. Moreover, it is usually possible to use materials capable of occluding and releasing lithium ion, such as metal lithium and its alloys; tin and silicon, and alloys thereof; oxides of silicon, titanium, and cobalt; and nitrides of manganese, iron, and cobalt. Of these, graphite is preferably used as the cathode active material for the following reasons: per-weight energy that can be taken out from graphite is high, and graphite has a negative discharge potential and is good in evenness. Lithium titanate is also preferably used because it is highly safe and is excellent in output characteristics and cycle characteristics.

In the electrode active material layer, the cathode active material is present in the form of particles. The shape of the particles of the cathode active material varies depending on their size. The mean particle diameter of the cathode active material particles in the electrode active material layer is usually from about 0.1 to 30 μm. The mean particle diameter herein is the mean value of measurements obtained by laser diffraction/scattering particle-size-distribution measurement (volume median particle diameter: 50D).

Metal Oxide:

Examples of the metal oxide to be incorporated in the electrode active material layer in the present invention include copper oxide, iron oxide, yttrium oxide, barium oxide, titanium oxide, aluminum oxide, zinc oxide, and nickel oxide. The metal oxide may be an oxide containing two or more different metal elements. Examples of such metal oxides include metal double oxides such as iron titanium oxide and lanthanum lithium titanium oxide.

A particularly favorable example of the above metal oxide is copper oxide. Copper oxide is preferred as the metal oxide in the present invention for the following reasons: copper produced in the electrode active material by reduction of copper oxide does not react with lithium ion (i.e., does not occlude or release lithium ion), and copper oxide is excellent in electrical contact with the current collector. Yttrium oxide too is favorable as the metal oxide in the present invention because it can contribute to the attainment of extremely high percentages of discharge capacity retention.

Other particularly favorable examples of the metal oxide are ternary metal double oxides (ternary metal coplex oxides) containing three different metal elements. Of these, $La_xLi_yTiO_3$ is preferred as the metal oxide in the present invention. By selecting $La_xLi_yTiO_3$, an oxide of lanthanum, lithium and titanate, as the metal oxide for use in the present invention, it is possible to produce a cathode for a non-aqueous electrolyte secondary battery that is improved particularly in output and input characteristics.

Although no limitations are imposed on the ratio between lanthanum and lithium in the above $La_xLi_yTiO_3$, it is particularly preferred that lanthanum and lithium be in a ratio that fulfills the conditions $0<X<1$ and $0<Y<1$. The reason why $La_xLi_yTiO_3$ in which X and Y are in the above ranges is preferred is not clear. $La_xLi_yTiO_3$ with X and Y in the above ranges, however, makes lithium ion conduction in the electrode better, and this may be a factor that provides favorable consequences.

Simple Metal:

The simple metal that is incorporated in the electrode active material layer in the present invention is a compound consisting only of a metal element/metal elements, produced by reduction of the metal oxide. In the present invention, the simple metal includes not only a compound consisting of one metal element but also a composite metal consisting of two or more metal elements. Specific examples of the simple metal include single metals such as copper, iron, yttrium, barium, titanium, aluminum, zinc and nickel, binary composite metals containing titanium, and ternary composite metals containing titanium. Although no limitations are imposed on the ratio between lanthanum and lithium in $La_xLi_yTi$, which is a favorable example of ternary composite metals, it is particularly preferred that lanthanum and lithium be in a ratio that fulfills the conditions $0<X<1$ and $0<Y<1$. The reason why $La_xLi_yTi$ in which X and Y are in the above ranges is preferred is not clear. Such a ternary composite metal, however, makes lithium ion conduction in the electrode better, and this may be a factor that provides favorable consequences.

The reason why a metal oxide or a simple metal is incorporated in the electrode active material layer in the present invention is as follows. Right after production (an example of the production method will be described later in detail), the cathode for a non-aqueous electrolyte secondary battery of the present invention contains a metal oxide. This metal oxide can be reduced during the initial charging process using the cathode, and a simple metal is thus sometimes produced by reduction of the metal oxide. Moreover, the simple metal is not oxidized during the discharging process that is conducted after the initial charging process, and even during the charging process that is repeatedly conducted after the discharging process, so that the simple metal produced by reduction of the metal oxide remains as is in the electrode active material layer. In the present invention, therefore, the simple metal in the electrode active material layer is one produced in the electrode active material layer by reduction of the metal oxide. The significant feature of the invention is that a particulate cathode active material is fixed to a current collector owing to the presence of the metal oxide or simple metal, without a resinous binder, which has been used in the prior art.

It is herein desirable that the metal oxide or simple metal do not occlude or release any alkaline metal. The reason for this is as follows. If the metal oxide or simple metal electrochemically reacts with an alkaline metal, the reaction entails expansion of the metal oxide or simple metal, or yields a reaction product, which leads to deterioration of the electrode active material layer. It is therefore preferred that the metal oxide or simple metal for use in the present invention be one that does not occlude or release lithium ion, unlike the cathode active material in the electrode active material layer of the cathode.

Whether or not the metal oxide or simple metal occludes and releases an alkaline metal can be confirmed by an electrochemical measuring (cyclic voltammetry) method.

Specifically, the measurement is carried out by repeating three times the operation of sweeping the electrode potential within the voltage range optimal to the active material, e.g., from 2.0 V to 0.3 V if the active material is graphite and the alkaline metal is lithium ion, and returning it to 2.0 V. In this operation, it is preferred that the rate of scanning be 1 mV/sec. Peaks showing reduction and oxidation of graphite that correspond to introduction and elimination of Li, respectively, appear at a voltage of about 0.2 V or less in the cyclic voltammetory test. By this, it is possible to confirm that lithium-ion occlusion and release reactions took place. On the other hand, if the above peaks do not appear, it can be judged that occlusion and release of lithium ion did not occur.

Prior to the production of the cathode plate for a non-aqueous electrolyte secondary battery of the present invention, whether or not a metal oxide to be incorporated in the electrode active material layer occludes and releases an alkaline metal can be confirmed in the above-described manner. Thus, it is possible to incorporate, in the electrode active material layer, a metal oxide that has been confirmed that it does not occlude and release an alkaline metal. On the other hand, whether or not the metal oxide or simple metal contained in the electrode active material layer in the completed cathode plate occludes or releases an alkaline metal can be confirmed in the following manner, for example. A sample obtained by scraping the electrode active material layer is subjected to composition analysis. By this, it is possible to estimate what metal oxide or simple metal is contained in the sample. A coating film composed of the estimated metal oxide or simple metal is formed on a substrate such as copper or aluminum foil. By subjecting this specimen to a cyclic voltammetory test, it is possible to confirm whether or not the metal oxide or simple metal occludes and releases an alkaline metal.

Other Materials:

Although it is possible to form the electrode active material layer for the cathode plate of the present invention only from the above-described cathode active material and metal oxide or simple metal, additives may further be incorporated in the electrode active material layer within the scope of the invention. For example, in order to ensure good electron conduction, a conductive material may be incorporated in the electrode active material layer. Conductive materials that are usually used in cathodes for non-aqueous electrolyte secondary batteries can be used as the above conductive material. Examples of such conductive materials include carbonaceous materials such as carbon blacks, e.g., acetylene black and ketjen black. It is preferred that the mean primary particle diameter of the conductive material be in the order of 20 to 50 nm. The mean primary particle diameter can be obtained from the arithmetic mean value of the particle diameters actually measured with an electron microscope. Although the conductive material may be incorporated in the electrode active material layer in any amount, it is usually used in an amount of 5 to 20 parts by weight for 100 parts by weight of the cathode active material. When the conductive material is added in an amount of less than 5 parts by weight for 100 parts by weight of the cathode active material, the effect of the addition of the conductive material can be scarcely obtained. Although the mention of the above range of the amount of a conductive material to be added never means the exclusion of addition of a conductive material in an amount of more than 20 parts by weight, if a conductive material is added in an excessively large amount, the following problems sometimes arise: it becomes difficult to disperse the ingredients of the electrode active material layer uniformly; the conductive material fills in the pores in the electrode active material layer, depending on the shape of the conductive material; the electrode active material layer has a decreased volume (weight) energy density; and so on. This should be kept in mind.

Although no limitations are imposed on the thickness of the electrode active material layer in the present invention, the electrode active material layer may be formed so that it has a thickness of 1 µm or more and 100 µm or less. If the thickness of the electrode active material layer is less than 1 µm, there is the possibility that a battery using such an electrode active material layer has decreased energy density. On the other hand, when the thickness of the electrode active material layer is more than 100 µm, high energy density can be obtained, but the electrode active material layer shows decreased adhesion to the current collector, or has increased resistivity, which may lead to decrease in discharge rate. The present invention has the advantageous features that the electrode active material layer can be made thinner than conventional ones, and that even if the electrode active material layer has a decreased thickness, it can provide satisfactorily high output and input characteristics.

(Method for Evaluating Charge & Discharge Rates of Electrode)

The output and input characteristics of a cathode for a non-aqueous electrolyte secondary battery of the present invention can be evaluated by the percentage of discharge capacity retention. Namely, the percentage of discharge capacity retention can be used to evaluate discharge rate characteristics, and it is generally understood that a cathode plate improved in discharge rate characteristics is improved in charge rate characteristics as well. It is therefore considered that a cathode showing a desirable percentage of discharge capacity retention is improved in charge and discharge rate characteristics. More specifically, the discharge rate 1 C is set so that the theoretical discharge capacity (mAh/g) of the cathode active material can be completely discharged in 1 hour, and the discharge capacity value (mAh/g) actually measured at the discharge rate 1 C is taken as 100% discharge capacity retention. Further, the discharge capacity value (mAh/g) is measured at an increased discharge rate. The percentage of discharge capacity retention can be obtained by using the following Equation 1:

$$[\text{the percentage of discharge capacity retention (\%)}] = \frac{[\text{the discharge capacity at each discharge rate (mAh/g)}]}{[\text{the discharge capacity at 1C (mAh/g)}]} \qquad [\text{Equation 1}]$$

The present invention has the feature that a cathode active material is fixed to a current collector owing to a metal oxide, in the absence of a resinous binder, which has been used in the prior art. The present invention can therefore provide a cathode for a non-aqueous electrolyte secondary battery that is excellent in high output and input characteristics. Particularly, as for the electrical performance of the cathode, it is desirable that the percentage of discharge capacity retention of the cathode be 80% or more at a discharge rate of 10 C. Moreover, in the fields where non-aqueous electrolyte secondary batteries are used, it is more desirable that the percentage of discharge capacity retention of the cathode be 85% or more at a discharge rate of 10 C, and 60% or more at a discharge rate of 50 C. This is because such a cathode shows high performance even in the case where high output and input characteristics are particularly required.

The above discharge capacity retention can be obtained by measuring the discharge capacity of the electrode itself placed in a three-electrode-type beaker cell and using the above Equation 1.

[Method for Producing Cathode Plate for Non-aqueous Electrolyte Secondary Battery]

Next, a method for producing a cathode plate for a non-aqueous electrolyte secondary battery of the present invention (hereinafter referred also to simply as "a production method of the present invention") will be described. In the production method of the present invention, a metal ion solution containing metal ions is first prepared by dissolving a metal compound serving as a precursor to a metal oxide (hereinafter also referred to as "a metal oxide precursor") in a solvent, and then an electrode active material layer-forming composition is prepared by blending a cathode active material with the metal ion solution. The electrode active material layer-forming composition is applied to a current collector and is then heated, thereby removing the solvent in the electrode active material layer-forming composition and oxidizing the metal ion contained in the composition to a metal oxide. In this process, substantially no resinous binder is added to the electrode active material layer-forming composition. When the metal oxide is produced on the surface of the current collector, the cathode active material fixes to the current collector surface owing to the presence of the metal oxide and forms a coating film. Consequently, an electrode active material layer containing the cathode active material and the metal oxide is formed on the current collector. In this manner, a cathode plate for a non-aqueous electrolyte secondary battery of the invention is produced. The method for producing a cathode plate for a non-aqueous electrolyte secondary battery of the present invention will be described hereinafter more specifically.

For the preparation of an electrode active material layer-forming composition to be used in the production method of the present invention, at least a metal oxide precursor, a solvent, and a cathode active material are used, as mentioned above. To these essential ingredients, additives such as conductive materials may further be added, as needed. The cathode active material and the additives such as conductive materials are the same as those described above, so that their explanation is not repeated here.

Precursor to Metal Oxide

The metal oxide precursor (precursor to metal oxide) for use in the present invention is a metal-element-containing compound that contains a metal element making up the metal oxide, and chlorides, nitrates, sulfates, perchlorates, acetates, phosphates, and bromates of the metal element can be mentioned as examples of the metal-element-containing compound. Of these compounds, chlorides, nitrates, and acetates are preferably used because they are easily available as general-purpose products, and when solutions of these metal salts in organic solvents such as alcohols are applied to current collectors, and the coating films formed on the current collectors are heated, chlorine ions, nitric acid ions, and acetic acid ions can be easily eliminated from the coating films. It is desirable to use a nitrate as the metal oxide precursor since it is excellent particularly in the property of forming a film on a current collector. Namely, since nitrates have lower thermal decomposition temperatures as compared with chlorides, etc., it is easy to eliminate nitric acid ions by heat that is applied to an electrode active material layer-forming composition applied to a current collector, thereby forming an electrode active material layer on the current collector, and is thus easy to make the metal (metal ions) remaining in the coating film into an oxide. Consequently, the cathode active material dispersed and mixed in the solvent can be easily fixed to the surfaces of a wide variety of substrates (current collectors).

In order to produce, in the electrode active material layer, a metal oxide containing two or more different metal elements, two or more metal salts are dissolved in a solvent.

Specific examples of the metal oxide precursor are copper chloride, copper nitrate, copper acetate, copper sulfate, copper acetyl acetonate, etc. when the metal element is copper; iron nitrate, iron acetate, iron acetyl acetonate, etc. when the metal element is iron; yttrium chloride, yttrium nitrate, yttrium acetate, yttrium acetyl acetonate, etc. when the metal element is yttrium; titanium acetyl acetonate, titanium diisopropoxybisacetyl acetonate, etc. when the metal element is titanium; aluminum chloride, aluminum nitrate, aluminum acetyl acetonate, etc. when the metal element is aluminum; barium chloride, barium acetate, barium nitrate, etc. when the metal element is barium; zinc chloride, zinc acetate, zinc nitrate, zinc acetyl acetonate, etc. when the metal element is zinc; and nickel chloride, nickel acetate, nickel nitrate, nickel acetyl acetonate, etc. when the metal is nickel.

Alternatively, if incorporation of an oxide of lanthanum, lithium and titanium ($La_xLi_yTiO_3$) or its reduction product in the electrode active material layer is intended, a mixture composed of titanium acetyl acetonate or titanium diisopropoxybisacetyl acetonate; a lanthanum salt selected from lanthanum chloride, lanthanum nitrate, lanthanum acetate, lanthanum acetyl acetonate, lanthanum isopropoxide, etc.; a lithium salt selected from lithium chloride, lithium nitrate, lithium acetate, lithium carbonate, lithium acetyl acetonate, etc.; and a solvent can be used as the metal oxide precursor.

Solvent:

Any solvent can be used for preparing a metal ion solution by dissolving the metal oxide precursor, as long as it can dissolve the metal oxide precursor. Examples of such solvents include lower alcohols having five or less carbon atoms, such as methanol, ethanol, isopropanol, propanol, and butanol; diketones such as acetyl acetone, diacetyl acetone, and benzoyl acetone; ketoesters such as ethyl acetoacetate, ethyl pyruvate, ethyl benzoyl acetate, and ethyl benzoyl formate; toluene, ethylene glycol, diethylene glycol and polyethylene glycol; and mixtures of these solvents.

By mixing the metal ion solution prepared by dissolving the metal oxide precursor in a solvent with the above-described cathode active material, there is prepared an electrode active material layer-forming composition. The amounts of the metal oxide precursor and the cathode active material to be used for preparing the electrode active material layer-forming composition are determined in consideration of the performance and the electric capacity required for the cathode plate that is finally obtained, or of the performance and the electric capacity required for an anode plate that is used in combination with the cathode plate. Particularly, in the electrode active material layer-forming composition, the concentration of the metal ion originated from the metal oxide precursor is preferably from 0.01 to 5 mol/litter, particularly from 0.1 to 2 mol/litter. When this concentration is less than 0.01 mol/litter, the electrode active material layer sometimes cannot show sufficiently high adhesion to a current collector. On the other hand, when the concentration is more than 5 mol/litter, the electrode active material layer-forming composition has an excessively high viscosity, which may make it difficult to apply the electrode active material layer-forming composition to a current collector uniformly. When formation of a metal double oxide containing two or more different metal elements as the metal oxide is intended, it is preferred that the total of the metal ion concentrations of the different metal elements present in the metal double oxide be in the above-described range.

No limitations are imposed on the amount of the cathode active material in the electrode active material layer-forming composition. In order to ensure good adhesion to a current collector and a sufficiently high discharge rate, it is desirable to use the cathode active material in such an amount that the electrode active material layer-forming composition has a cathode active material content of 50 to 98% by weight, more preferably 70 to 95% by weight, of the solid matter of the composition. When the cathode active material content is 50% by weight or more, a cathode having high energy density can be obtained. On the other hand, a cathode active material content of less than 98% by weight makes it possible to ensure that the metal oxide precursor and the conductive material are present in sufficiently large amounts in the electrode active material layer, and to provide an electrode active material layer that shows desirable adhesion to a current collector and discharge rate characteristics.

No limitations are imposed on the ratio between the metal oxide and the cathode active material in the electrode active material layer, and this ratio can be determined properly in consideration of the type and size of the cathode active material to be used, the type of the metal oxide, the functions required for the cathode plate, and so forth. In general, however, when the electrode active material content of the electrode active material layer is higher, an electrode having a higher electric capacity is obtained. It can therefore be said that the smaller is the amount of the metal oxide present in the electrode active material layer, the better. More specifically, in the electrode active material layer, the proportion of the metal oxide can be made 1 part by weight or more and 50 parts by weight or less for 100 parts by weight of the cathode active material. When the proportion of the metal oxide is less than 1 part by weight for 100 parts by weight of the cathode active material, the cathode active material sometimes cannot satisfactorily fix to a current collector. The mention of the above upper limit of the proportion by weight of the metal oxide never means the exclusion of a case where the metal oxide is present in an amount of more than 50 parts by weight for 100 parts by weight of the cathode active material, but shows the following: in order to fix the active material to a current collector, it is possible to use a smaller amount of the metal oxide so that an electrode having an increased electric capacity can be obtained. The amounts of the cathode active material and the metal oxide precursor to be used in the electrode active material layer-forming composition too can be determined in consideration of the amounts of the metal oxide and the electrode active material to be incorporated in the electrode active material layer.

Next, the electrode active material layer-forming composition prepared in the above-described manner is applied to such a current collector as is described above, thereby forming a coating film. The amount of the electrode active material layer-forming composition to be applied can be freely determined in consideration of the intended use of the current collector, and so forth. For example, the electrode active material layer-forming composition is applied in such an amount that it can form a cathode active material layer with a thickness of about 1 to 100 µm. No limitations are imposed on the method for applying the composition, and a conventional coating process can be employed. For example, the electrode active material layer-forming composition can be uniformly applied to a current collector by means of printing, spin coating, dip coating, bar coating, spray coating, or the like. In the case where the substrate surface is porous, or has a large number of irregularities, or is three-dimensional, the electrode active material layer-forming composition may be applied to the substrate by a method other than the above-described ones.

Subsequently, the current collector coated with the electrode active material layer-forming composition is heated. In this step, when the metal ion originated from the metal oxide precursor contained in the coating film is heated to a temperature higher than the oxidation temperature of the metal, a metal oxide is produced on the current collector. Although the heating temperature varies depending on the type of the metal oxide precursor used, and so on, it is generally in a range of 150 to 800° C. Further, when the coating film is heated, the solvent present in it is removed, and the cathode active material present in the coating film is fixed to the current collector owing to the presence of the metal oxide. As a result, an electrode active material layer containing the metal oxide and the cathode active material is formed on the current collector, and a cathode plate for a non-aqueous electrolyte secondary battery of the present invention is produced.

In the above step of heating, any heating means can be used, and a hot plate, an oven, a heating furnace, an infrared heater, a halogen heater, or a hot air blower can be used, for example. The current collector coated with the electrode active material layer-forming composition can be heated satisfactorily also in a roll-to-roll manner in an atmospheric heating furnace.

[Non-aqueous Electrolyte Secondary Battery]

A non-aqueous electrolyte secondary battery 10 usually comprises a cathode 14 with a cathode plate 15, an anode 16 with an anode plate 17, and a separator 13 separating the cathode 14 with the cathode plate 15 from the anode 16 with the anode plate 17; and the cathode 14 with the cathode plate 15, the anode 16 with the anode plate 17, and the separator 13 are placed in a container 11, as shown in FIG. 2(a). The separator 13 is made of a polyethylene porous film, and the container 11 is filled with a non-aqueous electrolyte 19.

Cathode Plate:

The aforementioned cathode plate of the present invention is used in a non-aqueous electrolyte secondary battery of the present invention.

Anode Plate:

An anode plate that is used in a conventional non-aqueous electrolyte secondary battery can be used herein. For example, there can be used an anode plate composed of an ordinary anode current collector such as aluminum foil, and an electrode active material layer formed on the current collector by fixing an anode active material capable of occluding and releasing lithium ion, such as a lithium-containing metal oxide, e.g., lithium cobaltate, lithium manganate, or lithium nickelate, with the use of a resinous binder that is a thermoplastic resin such as polyester, polyamide, or polyacrylic acid polyester resin. The electrode active material layer in the anode plate too may contain such a conductive material as is described above. Although no limitations are imposed on the thickness of the current collector for use in the anode, aluminum foil with a thickness of about 5 to 50 µm is usually used.

The above conventionally known anode plate is usually obtained in the following manner: a slurried coating liquid containing an anode active material, a resinous binder, and additives such as a conductive material is applied to at least part of the surface of a current collector, is dried, and, if necessary, is pressed.

Non-Aqueous Electrolyte:

Although any non-aqueous electrolyte that is usually used for non-aqueous electrolyte secondary batteries can be used as the non-aqueous electrolyte in the present invention, it is preferable to use a non-aqueous electrolyte prepared by dissolving lithium salt in an organic solvent.

Typical examples of the lithium salt include inorganic lithium salts such as $LiCO_4$, $LiBF_4$, $LiPF_6$, $LiAsF_6$, LiCl, and LiBr; and organic lithium salts such as $LiB(C_6H_5)_4$, $LiN(SO_2CF_3)_2$, $LiC(SO_2CF_3)_3$, $LiOSO_2CF_3$, $LiOSO_2C_2F_5$, $LiOSO_2C_4F_9$, $LiOSO_2C_5F_{11}$, $LiOSO_2C_6F_{13}$, and $LiOSO_2C_7F_{15}$.

Examples of the organic solvent to be used to dissolve the lithium salt include cyclic esters, chain esters, cyclic ethers, and chain ethers.

Specific examples of the cyclic esters include propylene carbonate, butylene carbonate, γ-butyrolactone, vinylene carbonate, 2-methyl-γ-butyrolactone, acetyl-γ-butyrolactone, and γ-valerolactone.

Specific examples of the chain esters include dimethyl carbonate, diethyl carbonate, dibutyl carbonate, dipropyl carbonate, methyl ethyl carbonate, methyl butyl carbonate, methyl propyl carbonate, ethyl butyl carbonate, ethyl propyl carbonate, butyl propyl carbonate, alkyl propionates, dialkyl malonates, and alkyl acetates.

Specific examples of the cyclic ethers include tetrahydrofuran, alkyltetrahydrofurans, dialkyltetrahydrofurans, alkoxytetrahydrofurans, dialkoxytetrahydrofurans, 1,3-dioxolane, alkyl-1,3-dioxolanes, and 1,4-dioxolane.

Specific examples of the chain ethers include 1,2-dimethoxyethane, 1,2-diethoxythane, diethyl ether, ethylene glycol dialkyl ethers, diethylene glycol dialkyl ethers, triethylene glycol dialkyl ethers, and tetraethylene glycol dialkyl ethers.

A suitable conventional structure can be selected for the structure of the battery (cell) to be produced using the above-described anode plate, cathode plate, separator, and non-aqueous electrolyte. For example, the following structure can be adopted: an anode plate and a cathode plate are spirally wound up with a separator made of a polyethylene porous film or the like between the anode plate and the cathode plate, and this one is placed in a battery (cell) container. Another possible embodiment is as follows: an anode plate and a cathode plate that have been cut into a desired shape are layered over each other with a separator between the anode plate and the cathode plate and are bound together, and this one is placed in a battery (cell) container. In either structure, after placing the anode plate and the cathode plate in the battery (cell) container, lead wire attached to the anode plate is connected to an anode terminal provided on an outer container. On the other hand, lead wire attached to the cathode plate is connected to a cathode terminal provided in the outer container. The battery container is filled with a non-aqueous electrolyte and sealed, whereby a non-aqueous electrolyte secondary battery is produced.

EXAMPLES

Example 1

Production of Cathode Plate:

A starting material for a metal oxide was prepared by adding 40 g of copper chloride to 40 g of methanol. To this mixture was added 20 g of synthetic graphite with a mean particle diameter of 20 μm as a cathode active material, and the mixture was kneaded with an Excel Auto-Homogenizer (manufactured by NIHONSEIKI Co., Ltd., Japan) at 8000 rpm for 15 minutes, thereby preparing a cathode active material layer-forming composition.

Next, the electrode active material layer-forming composition was applied to one surface of electrolytic copper film with a thickness of 10 μm, serving as a cathode current collector, with an applicator (2 mil), whereby a coating film was formed.

The cathode current collector having thereon the coating film was placed in an electric oven and was heated at a temperature of 250° C. for 1 hour, thereby forming an electrode active material layer with a thickness of 20 μM on the current collector. In this manner, a cathode plate was obtained. The cathode plate was cut into a piece in a predetermined size (in the shape of a circle with a diameter of 15 mm), whereby a cathode of Example 1 was obtained.

Preparation of Three-Electrode Beaker Cell:

A non-aqueous electrolyte was prepared by adding lithium phosphate hexafluoride ($LiPF_6$), solute, to a solvent mixture of ethylene carbonate (EC)/dimethyl carbonate (DMC) (=1:1 by volume), and adjusting the lithium phosphate hexafluoride concentration to 1 mol/L.

Using the cathode plate of Example 1 (in the shape of a circle with a diameter of 15 mm, weight of the cathode active material layer: 16.7 $g/m^2$) as the working electrode, metal lithium plates obtained by bringing metal lithium foil into pressure contact with nickel mesh as the opposite electrode and the reference electrode, and the above-prepared non-aqueous electrolyte as the electrolyte, a three-electrode beaker cell was assembled after attaching lead wire (nickel wire) to the electrodes (cathode plate, opposite electrode, and reference electrode) with a spot welding machine, whereby a test cell of Example 1 (Test Cell 1) was obtained. This test cell was subjected to the following charge and discharge tests.

<Evaluation of Adhesion of Electrode Active Material Layer>

The adhesion of the electrode active material layer to the current collector was evaluated in accordance with the following criteria. In the course of the assemblage of a three-electrode beaker cell with the use of one of the test cells of Examples and Comparative Examples, when the electrode active material layer partially peeled off and could not be subjected to the charge and discharge tests that will be described later, the adhesion of the electrode active material layer to the current collector was rated as poor; and when the electrode active material layer did not peel off and could be subjected to the charge and discharge tests, its adhesion to the current collector was rated as excellent. The results of the evaluation are collectively shown in Table 2.

<Charge & Discharge Tests>

Test Cell 1, the three-electrode beaker cell assembled in the above-described manner, was fully charged in accordance with the procedure described under the following "Charge Test", in order to carry out a working electrode discharge test.

Charge Test:

Test Cell 1 was charged at a constant current (651 μA) in an atmosphere at 25° C. until the voltage reached 0.03 V. After the voltage had reached 0.03 V, the current (discharge rate: 1 C) was reduced to below 5% while keeping the voltage at 0.03V or more, and constant-voltage charge was conducted until the test cell was fully charged. After this, the test cell was rested for 10 minutes. The above "1 C" is the current value at which the three-electrode beaker cell discharges completely (the final discharge voltage is attained) in one hour when it is discharged at a constant current. The above constant current was set so that 372 mAh/g, the theoretical discharge capacity of synthetic graphite, the active material on the working electrode of Test Cell 1, would be discharged in 1 hour.

Discharge Test:

Test Cell 1 that had been fully charged was discharged at a constant current (651 μA) (discharge rate: 1 C) in an atmosphere at 25° C. until the voltage increased from 0.03 V (full discharge voltage) to 2.0 V (final discharge voltage). Plotting cell voltage (V) as the ordinate and discharge time (h) as the abscissa, a discharge curve was drawn. Using this curve, the discharge capacity value (mAh) of the working electrode (the cathode of Example 1) was obtained; it was converted into the value of the discharge capacity per unit weight (mAh/g) of the active material layer of the working electrode.

Subsequently, on the basis of the constant-current discharge test carried out in the above-described manner at a constant current of 651 µA (discharge rate: 1 C, discharge completion time: 1 hour), constant-current discharge tests were carried out at a constant current of 1.30 mA, 2 times the above current (discharge rate: 20 C, discharge completion time: 30 minutes), at a constant current of 3.26 mA, 5 times the above current (discharge rate: 5 C, discharge completion time: 12 minutes), at a constant current of 6.51 mA, 10 times the above current (discharge rate: 10 C, discharge completion time: 6 minutes), and at a constant current of 32.55 mA, 50 times the above current (discharge rate: 50 C, discharge completion time: 1.2 minutes). The discharge capacity values (mAh) of the working electrode at the respective discharge rates were obtained; they were converted into the values of discharge capacity per unit weight (mAh/g).

<Calculation of Percentages of Discharge Capacity Retention>

In order to evaluate the discharge rate characteristics of the working electrode, the percentages of discharge capacity retention were obtained by using the above Equation 1 and the above values of discharge capacity per unit weight (mAh/g) obtained at the respective discharge rates. The values of discharge capacity per unit weight (mAh/g) at the respective discharge rates obtained from the above discharge tests and the percentages of discharge capacity retention calculated are collectively shown in Table 2.

<Alkaline Metal Occlusion/Release Confirmation Test>

Whether or not the metal oxide and the simple metal to be produced in the electrode active material layer in the cathode of Example 1 occlude and release an alkaline metal was confirmed in the following manner. In this test, it was confirmed whether or not the metal oxide to be produced on the current collector occludes and releases metal lithium.

Figure 1:
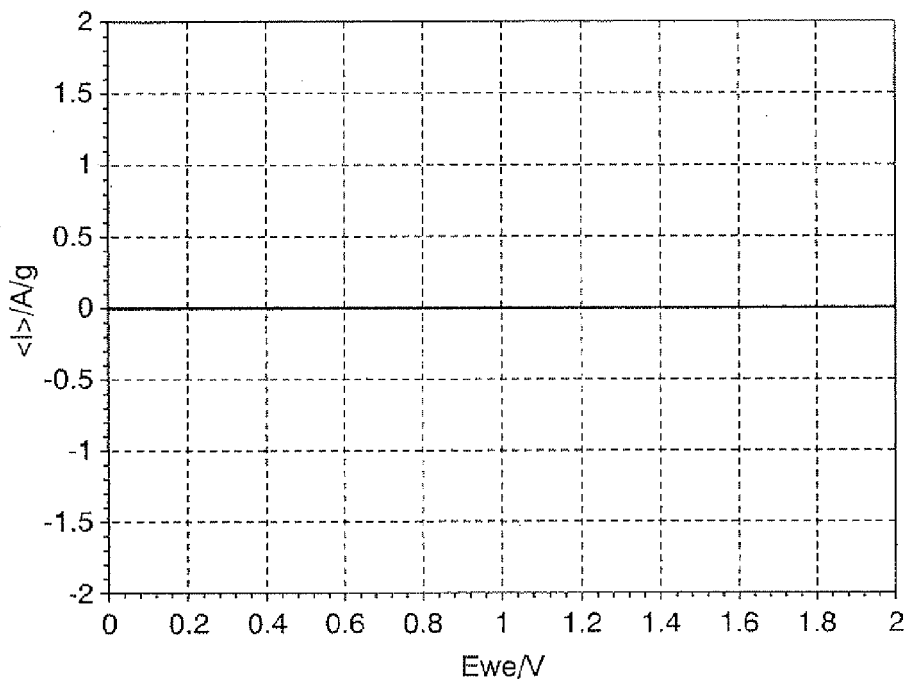
FIG. 1 is a cyclic voltammogram showing the result of the alkaline metal occlusion/release confirmation test carried out in Referential Example 1.

A laminate of Referential Example 1 was first prepared in the same manner as in Example 1, except that no cathode active material was used. The laminate of Referential Example 1 was subjected to a CV test. Specifically, the operation of sweeping the electrode potential from 2.0 V to 0.3V and then returning it to 2.0 V was repeated twice. The scanning rate was made 1 mV/sec. In the first cycle, an electrical current was detected because of various decomposition reactions. On the cyclic voltammogram (FIG. 1) showing the result from the second cycle, no cyclic peak was observed. This shows that the copper oxide produced in the laminate of Referential Example 1 does not occlude and release lithium ion. In this manner, it was confirmed beforehand that copper oxide, the metal oxide to be produced on the current collector in the cathode of Example 1, does not occlude and release lithium ion. In the item "alkaline metal occlusion/release" in Table 1, the above result is shown as "none". In this Example, a VMP3 manufactured by Bio Logic Corp. was used for the CV test.

Examples 2 to 9

Cathode plates were obtained in the same manner as in Example 1, provided that the metal salt, the cathode active material, the solvent, and the cathode current collector used in Example 1 were changed to those ones shown in Table 1, and were cut into pieces in the above predetermined size, whereby cathodes of Examples 2 to 9 were obtained. In Examples 2, 7 and 8, a conductive material shown in Table 1 was further added to the solvent, and the mixture was kneaded with a homogenizer. In any of Examples 1 to 9, a resinous binder was not used. The thicknesses of the electrode active material layers in the cathodes of Examples 1 to 9 are shown in Table 2.

With the use of the cathodes of Examples 2 to 9, three-electrode-beaker cells, test cells of Examples 2 to 9 (Test Cells 2 to 9), were assembled. These test cells were subjected to the above-described charge and discharge tests, and the percentages of discharge capacity retention were obtained by calculation. The results are collectively shown in Table 2. In the charge and discharge tests, although the constant current at a discharge rate of 1 C was set to 651 µA for Test Cell 1, it was set to 374 µA for Test Cell 2, to 662 µA to for Test Cell 3, to 445 µA for Test Cell 4, to 803 µA for Test Cell 5, to 944 µA for Test Cell 6, to 389 µA for Test Cell 7, to 384 µA for Test Cell 8, and to 861 µA for Test Cell 9.

In the production of the cathode of Example 9, the metal salt, starting material for a metal oxide, was prepared in the following manner. 3 g of lanthanum nitrate and 0.28 g of lithium acetate were first added to and dissolved in a solvent mixture of 1.5 g of isopropyl alcohol and 24.7 g of ethanol. To this solution was further added 4.5 g of titanium diisopropoxybisacetyl acetonate. After stirring the mixture, 6 g of polyethylene glycol was added, and the mixture was stirred.

Furthermore, laminates of Referential Examples 2 to 9 corresponding to the cathodes of Examples 2 to 9 were made in the same manner as in the alkaline metal occlusion/release confirmation test described above. No peak was observed on the cyclic voltammogram of any of the laminates of Referential Examples 2 to 9. Thus, it was confirmed beforehand that the metal oxides to be produced in the electrode active material layers in the cathodes of Examples 2 to 9 do not occlude and release metal lithium. The results are collectively shown in Table 2.

Comparative Example 1

3 g of polyvinylidene fluoride, resinous binder, was added to 41 g of synthetic graphite with a mean particle diameter of 20 µm, starting material for a cathode active material, and 56 g of N-methyl-2-pyrrolidone, solvent, and the mixture was kneaded with an Excel Auto-Homogenizer (manufactured by NIHONSEIKI Co., Ltd., Japan) at 8000 rpm for 15 minutes, thereby obtaining a coating composition in the form of a slurry. The slurried coating composition was applied to copper foil with a thickness of 10 µm, serving as a cathode current collector, with an applicator (1 mil) and was dried with hot air, whereby a cathode active material layer with a thickness of 25 µm was formed on the cathode current collector.

After pressing the cathode active material layer with a roller press until its coating density reached 1.0 g/cm$^3$, the current collector with the pressed cathode active material layer was cut into a piece in a predetermined size (in the shape of a circle with a diameter of 15 mm), and was vacuum-dried at 120° C. for 12 hours, thereby obtaining a cathode plate of Comparative Example 1. The adhesion of the electrode active material layer to the current collector was evaluated in the same manner as in Example 1. The results are shown in Table 1.

<Charge Test & Discharge Test>

A three-electrode beaker cell of Comparative Example 1 was assembled in the same manner as in Example 1, except that the cathode of Comparative Example 1 was used instead of that of Example 1, thereby obtaining a test cell of Comparative Example 1. This test cell was subjected to the same charge and discharge tests as in Example 1, except that the constant currents at the respective discharge rates were changed to 1.22 mA (discharge rate: 1 C, discharge completion time: 1 hour), 12.2 mA (discharge rate: 10 C, discharge completion time: 6 minutes), 24.4 mA (discharge rate: 20 C, discharge completion time: 3 minutes), and 61.0 mA (discharge rate: 50 C, discharge completion time: 1.2 minutes). The discharge capacity values (mAh) of the working electrode at the respective discharge rates were obtained; they were converted into the values of discharge capacity per unit weight (mAh/g) of the active material. Further, using Equation 1, the percentages of discharge capacity retention were also obtained in the same manner as in Example 1. The results are collectively shown in Table 3.

Comparative Example 2

A cathode plate of Comparative Example 2 was obtained in the same manner as in Comparative Example 1, except that no resinous binder was used. With the use of this cathode, the inventors tried to assemble a test cell in the same manner as in Example 1 and to subject it to the charge and discharge tests. The electrode active material layer, however, was poor in adhesion to the current collector and peeled off it, so that it was impossible to subject the test cell to the charge and discharge tests.

As shown in Tables 2 and 3, all the cathodes of Examples 1 to 9 had higher percentages of discharge capacity retention than the cathode of Comparative Example 1. In particular, the percentages of discharge capacity retention of all the cathode plates of Examples 1 to 9 were 80% or more at a discharge rate of 10 C. It was thus confirmed that these cathode plates were excellent in discharge rate characteristics. Moreover, the percentages of discharge capacity retention of the cathodes of Examples 1 to 7 and 9 were 60% or more even at an increased discharge rate of 50 C. This demonstrates that these cathode plates are extremely good in high output and input characteristics.

As mentioned above, it was confirmed that the cathodes for non-aqueous electrolyte secondary batteries of the present invention can show extremely high percentages of discharge capacity retention and thus have extremely high discharge rate characteristics. This lead to the assumption that the cathode plates of the invention are excellent also in charge rate characteristics. It was confirmed by the results of the above charge and discharge tests that the cathode plates of the present invention are excellent in output and input characteristics. The use of the cathode plates of the invention, therefore, makes it possible to provide non-aqueous electrolyte secondary batteries more excellent in discharge rate characteristics than conventional ones.

On the other hand, although it was possible to charge and discharge the cathode plate of Comparative Example 1 at discharge rates of 1 C, 2 C and 5 C, the discharge curve became unstable when the discharge rate was increased to 10 C or more. Because of this, it was impossible to calculate the percentages of discharge capacity retention of the cathode. The above results show that the cathode plates of the present invention can easily be made to have high output and input characteristics as compared with conventional cathodes for non-aqueous electrolyte secondary batteries, comprising resinous binders.

Furthermore, it was substantially impossible to form an electrode active material layer in Comparative Example 2, since no resinous binder was used. On the other hand, it was confirmed that the electrode active material layers in the cathodes of Examples 1 to 9 have good adhesion to the current collectors, comparable to the electrode active material layer in the cathode of Comparative Example 1, although the electrode active material layers in Examples 1 to 9 do not contain resinous binders.

TABLE 1

|  |  | Example 1 | Example 2 | Example 3 | Example 4 | Example 5 | Example 6 | Example 7 | Example 8 |
|---|---|---|---|---|---|---|---|---|---|
| Metal salt | type | copper chloride | copper nitrate | copper nitrate | yttrium acetyl acetonate | Iron nitrate | barium nitrate | zinc nitrate | aluminum nitrate |
|  | alkaline metal occlusion/release | none | none | none | none | none | none | none | none |
|  | amount | 40 g | 19 g | 19 g | 19 g | 25 g | 2.5 g | 20 g | 20 g |
| Binder | type | — | — | — | — | — | — | — | — |
|  | amount | — | — | — | — | — | — | — | — |
| Solvent | type | methanol | methanol | methanol | methanol | methanol | water | methanol | methanol |
|  | amount | 40 g | 22 g | 22 g | 25 g | 7.5 g | 25 g | 19 g | 19 g |
| Cathode active material | type | synthetic graphite | lithium titanate | hard carbon | synthetic graphite | synthetic graphite | synthetic graphite | lithium titanate | lithium titanate |
|  | Particle diameter | 10 μm | 9 μm | 15 μm | 10 μm | 10 μm | 10 μm | 9 μm | 9 μm |
|  | amount | 20 g | 18 g | 10 g | 10 g | 10 g | 10 g | 18 g | 18 g |
| Conductive material | type | — | acetylene black | — | — | — | — | acetylene black | acetylene black |
|  | amount | — | 1.8 g | — | — | — | — | 1.8 g | 1.8 g |
| Cathode current collection | type | electrolytic copper foil | aluminum foil | electrolytic copper foil | electrolytic copper foil | electrolytic copper foil | electrolytic copper foil | aluminum foil | aluminum foil |
|  | thickness | 10 μm | 15 μm | 10 μm | 10 μm | 10 μm | 10 μm | 15 μm | 15 μm |

TABLE 1-continued

|  |  | Example 9 | | | Comparative Example 1 | Comparative Example 2 |
|---|---|---|---|---|---|---|
| Metal salt | type | lantanum nitrate | lithium nitrate | titanium diisopropoxy-bisacetyl-acetonate | — | — |
|  | alkaline metal occlusion/release |  | none |  | — | — |
|  | amount | 3 g | 0.28 g | 4.5 g |  |  |
| Binder | type |  | — |  | polyvinyl-idene fluoride | — |
|  | amount |  | — |  |  |  |
| Solvent | type | Isopro-panol | ethanol | polyethylene glycol | N-methyl-2-pyrrol-idone | N-methyl-2-pyrrol-idone |
|  | amount | 1.5 g | 24.7 g | 6 g | 56 g | 56 g |
| Cathode active material | type |  | graphite |  | synthetic graphite | synthetic graphite |
|  | Particle diameter |  | 16 μm |  | 10 μm | 10 μm |
|  | amount |  | 11 g |  | 41 g | 41 g |
| Conductive material | type |  | — |  | — | — |
|  | amount |  | — |  | — | — |
| Cathode current collection | type |  | electrolytic copper foil |  | electrolytic copper foil | electrolytic copper foil |
|  | thickness |  | 10 μm |  | 10 μm | 10 μm |

TABLE 2

|  | thickness of active material layer | metal oxide | adhesion | IC current value (μA) | discharge rate | discharge capacity (mAh/g) | percentage of discharge capacity retention (%) | weight of cathode active material layer (g/m²) |
|---|---|---|---|---|---|---|---|---|
| Example 1 | 20 μm | copper oxide | good | 651 | 1 C | 365 | 100 | 16.7 |
|  |  |  |  |  | 2 C | 362 | 99 |  |
|  |  |  |  |  | 5 C | 354 | 97 |  |
|  |  |  |  |  | 10 C | 332 | 91 |  |
|  |  |  |  |  | 50 C | 325 | 89 |  |
| Example 2 | 22 μm | copper Oxide | good | 374 | 1 C | 170 | 100 | 16.7 |
|  |  |  |  |  | 2 C | 170 | 100 |  |
|  |  |  |  |  | 5 C | 168 | 99 |  |
|  |  |  |  |  | 10 C | 165 | 97 |  |
|  |  |  |  |  | 50 C | 144 | 85 |  |
| Example 3 | 20 μm | copper oxide | good | 662 | 1 C | 365 | 100 | 16.7 |
|  |  |  |  |  | 2 C | 361 | 99 |  |
|  |  |  |  |  | 5 C | 347 | 95 |  |
|  |  |  |  |  | 10 C | 325 | 89 |  |
|  |  |  |  |  | 50 C | 234 | 64 |  |
| Example 4 | 18 μm | yttrium oxide | good | 445 | 1 C | 365 | 100 | 16.7 |
|  |  |  |  |  | 2 C | 365 | 100 |  |
|  |  |  |  |  | 5 C | 362 | 99 |  |
|  |  |  |  |  | 10 C | 358 | 98 |  |
|  |  |  |  |  | 50 C | 325 | 89 |  |
| Example 5 | 19 μm | iron oxide | good | 803 | 1 C | 365 | 100 | 16.7 |
|  |  |  |  |  | 2 C | 364 | 99 |  |
|  |  |  |  |  | 5 C | 346 | 95 |  |
|  |  |  |  |  | 10 C | 328 | 90 |  |
|  |  |  |  |  | 50 C | 255 | 70 |  |
| Example 6 | 23 μm | barium oxide | good | 944 | 1 C | 365 | 100 | 16.7 |
|  |  |  |  |  | 2 C | 362 | 99 |  |
|  |  |  |  |  | 5 C | 339 | 93 |  |
|  |  |  |  |  | 10 C | 296 | 81 |  |
|  |  |  |  |  | 50 C | 266 | 73 |  |

TABLE 2-continued

|  | thickness of active material layer | metal oxide | adhesion | IC current value (μA) | discharge rate | discharge capacity (mAh/g) | percentage of discharge capacity retention (%) | weight of cathode active material layer (g/m$^2$) |
|---|---|---|---|---|---|---|---|---|
| Example 7 | 22 μm | zinc oxide | good | 389 | 1 C | 170 | 100 | 16.7 |
|  |  |  |  |  | 2 C | 170 | 100 |  |
|  |  |  |  |  | 5 C | 169 | 99 |  |
|  |  |  |  |  | 10 C | 164 | 96 |  |
|  |  |  |  |  | 50 C | 148 | 87 |  |
| Example 8 | 22 μm | aluminum oxide | good | 384 | 1 C | 170 | 100 | 16.7 |
|  |  |  |  |  | 2 C | 166 | 98 |  |
|  |  |  |  |  | 5 C | 159 | 94 |  |
|  |  |  |  |  | 10 C | 149 | 88 |  |
|  |  |  |  |  | 50 C | 83 | 49 |  |
| Example 9 | 20 μm | *1 | good | 861 | 1 C | 365 | 100 | 16.7 |
|  |  |  |  |  | 2 C | 362 | 99 |  |
|  |  |  |  |  | 5 C | 351 | 96 |  |
|  |  |  |  |  | 10 C | 326 | 89 |  |
|  |  |  |  |  | 50 C | 285 | 78 |  |

*1: lanthanium-lithium-titanium oxide (ternary metal oxide)

TABLE 3

|  | thickness of active material layer | metal oxide | adhesion | IC current value (μA) | discharge rate | discharge capacity (mAh/g) | percentage of discharge capacity retention (%) | weight of cathode active material layer (g/m$^2$) |
|---|---|---|---|---|---|---|---|---|
| Comparative Example 1 | 25 μm | none | good | 1220 | 1 C | 365 | 100 | 20.1 |
|  |  |  |  |  | 2 C | 354 | 97 |  |
|  |  |  |  |  | 5 C | 310 | 85 |  |
|  |  |  |  |  | 10 C | unmeasurable | unmeasurable |  |
|  |  |  |  |  | 50 C | unmeasurable | unmeasurable |  |
| Comparative Example 2 | unmeasurable | none | poor | — | 1 C | — | — | — |
|  |  |  |  |  | 2 C | — | — |  |
|  |  |  |  |  | 5 C | — | — |  |
|  |  |  |  |  | 10 C | — | — |  |
|  |  |  |  |  | 50 C | — | — |  |

The invention claimed is:

1. A cathode plate for a non-aqueous electrolyte secondary battery, comprising:
   a current collector, and
   an electrode active material layer containing at least a cathode active material and a metal oxide or a simple metal, layered over the current collector,
   wherein the cathode active material is fixed to the current collector owing to the metal oxide or the simple metal, and
   the cathode active material does not include a resinous binder.

2. The cathode plate for a non-aqueous electrolyte secondary battery according to claim 1, wherein the metal oxide or the simple metal does not occlude or release any alkaline metal.

3. The cathode plate for a non-aqueous electrolyte secondary battery according to claim 2, wherein the metal oxide is copper oxide, yttrium oxide, iron oxide, barium oxide or zinc oxide, and the simple metal is copper, yttrium, iron, barium or zinc.

4. The cathode plate for a non-aqueous electrolyte secondary battery according to claim 2, wherein the metal oxide is a ternary metal double oxide containing three different metal elements, or the simple metal is a ternary composite metal composed of three different metal elements.

5. The cathode plate for a non-aqueous electrolyte secondary battery according to claim 4, wherein the ternary metal double oxide is $La_XLi_YTiO_3$ or the ternary composite metal is $La_XLi_YTi$.

6. The cathode plate for a non-aqueous electrolyte secondary battery according to claim 5, wherein in the ternary metal double oxide ($La_XLi_YTiO_3$) or in the ternary composite metal ($La_XLi_YTi$), lanthanum and lithium are in a ratio that fulfills the conditions $0<X<1$ and $0<Y<1$.

7. The cathode plate for a non-aqueous electrolyte secondary battery according to claim 1, wherein the cathode active material is a carbonaceous material or lithium titanate.

8. The cathode plate for a non-aqueous electrolyte secondary battery according to claim 1, wherein the simple metal is one produced in the electrode active material layer by reduction of the metal oxide.

9. A non-aqueous electrolyte secondary battery comprising:
   an anode plate,
   a cathode plate,
   a separator placed between the anode plate and the cathode plate,
   an electrolyte containing a non-aqueous solvent, and
   a container in which the anode plate, the cathode plate, the separator and the electrolyte are contained, wherein the cathode plate comprises:
- a current collector, and
- an electrode active material layer containing at least a cathode active material and a metal oxide or a simple metal, layered over the current collector, where the cathode active material is fixed to the current collector owing to the metal oxide or the simple metal, and the cathode active material does not include a resinous binder.

10. A method for producing a cathode plate for a non-aqueous electrolyte secondary battery, comprising the steps of preparing a current collector, preparing an electrode active material layer-forming composition by mixing at least a cathode active material with a metal ion solution containing at least one metal ion, applying the electrode active material layer-forming composition to the current collector, thereby forming a coating film, and heating the coating film so as to oxidize the at least one metal ion to form a metal oxide, wherein
- the forming of the metal oxide fixes the cathode active material to the current collector, thereby forming an electrode active material layer, and
- the cathode active material does not include a resinous binder.

* * * * *